UNITED STATES PATENT OFFICE.

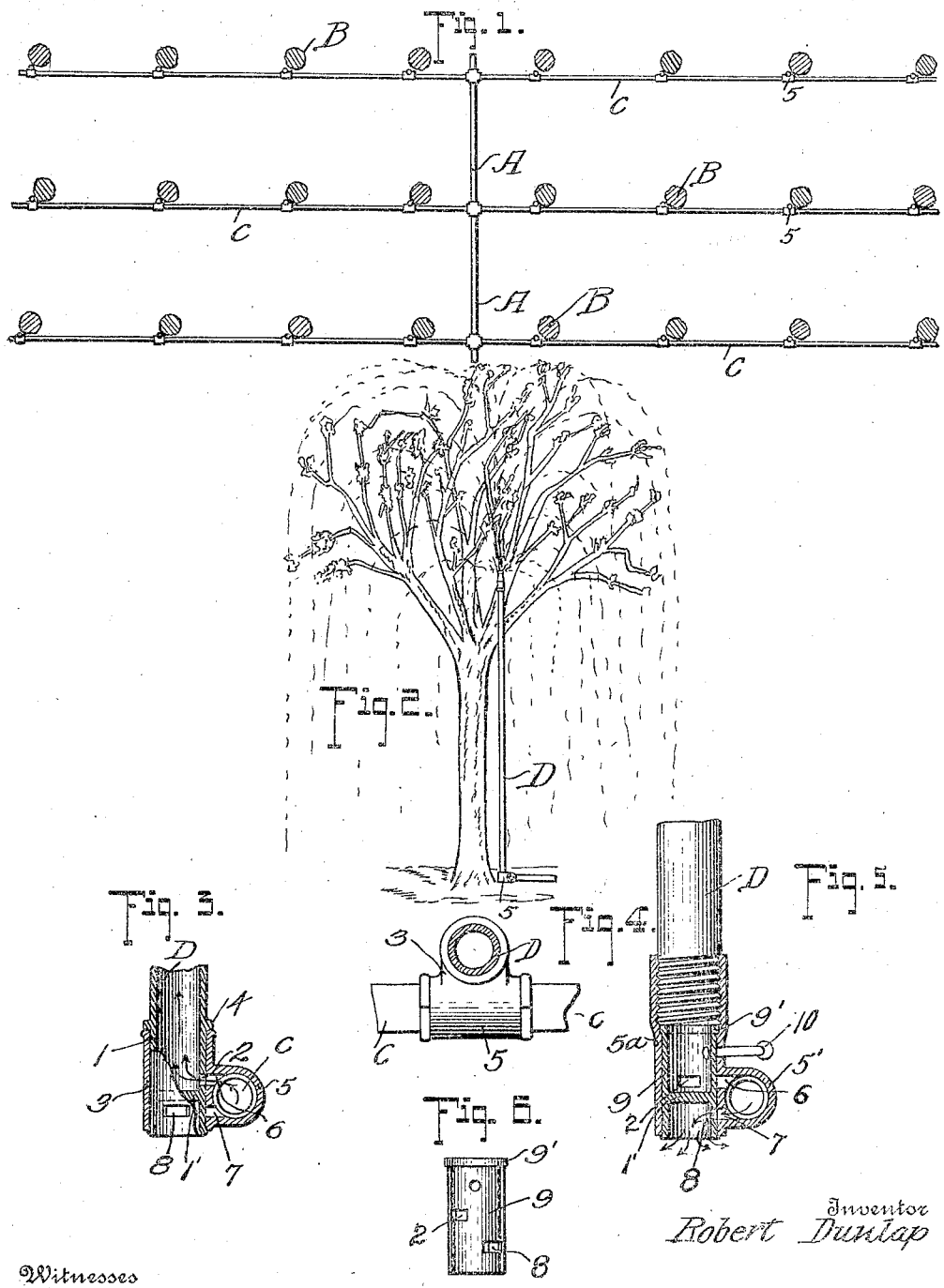

ROBERT DUNLAP, OF GRANTS PASS, OREGON.

TREE-SPRAYING AND IRRIGATING SYSTEM.

1,058,566.  Specification of Letters Patent.  Patented Apr. 8, 1913.

Application filed May 21, 1912. Serial No. 698,801.

*To all whom it may concern:*

Be it known that I, ROBERT DUNLAP, a citizen of the United States, residing at Grants Pass, in the county of Josephine and State of Oregon, have invented certain new and useful Improvements in Tree-Spraying and Irrigating Systems, of which the following is a specification.

The primary object of this invention is to provide a system whereby the buds of fruit trees may be effectively protected against injury by frost.

In carrying out the invention, the apparatus is to be so arranged that it will best perform the above function and will be serviceable for irrigating as well as spraying the trees or plants in an advantageous manner.

It is well known at the present time that orchards where subject to sudden changes involving the loss of total crops are protected by smudge pots and similar devices, but so much care is required for each individual apparatus that the efficacy of my system, by means of which each individual tree or plant may be protected or treated by merely turning into operation the fluid necessary for the result to be accomplished, will be appreciated.

For a full understanding of the present invention, reference is to be had to the following description and to the accompanying drawings, in which—

Figure 1 is a plan view of my system, showing the trees in section; Fig. 2 is a partial view, showing in elevation the method of spraying the individual trees; Fig. 3 is a partial sectional view of the valve coupling located at the intersection of the vertical and branch pipes; Fig. 4 is a top plan view of the same; Fig. 5 is a view of a modified form of valve; and Fig. 6 is a detail view of the valve member used in the modified form shown in Fig. 5.

Throughout the following detail description and on the several figures of the drawings, similar parts are referred to by like reference characters.

Describing specifically my system, and referring to the drawings, A represents a main supply conduit or pipe leading from a suitable source of water or liquid to be used, said pipe preferably extending through the orchard in the most convenient manner, such as transversely of the rows of trees or plants, designated B. Extending laterally from the main pipe A are provided the branch pipes or conduits C adapted to be arranged to pass in close proximity to the base of the trees and small pipes D extend vertically from the branch pipes C upwardly along the respective trunks to points near the tops of said trees where nozzles E are provided. The main and branch pipes may be placed above or below the surface of the ground.

As will be evident, the water, either from a pump or gravity source of supply, passes through the main pipe A, into the branches C and issues from the nozzles E at the tops of the vertical pipes D, whereby a fine spray of the liquid is caused to be thrown out over each individual tree. This has been found to very effectively prevent frost from injuring the buds at such times when the frost is likely to occur.

This same system can be equally well applied to shrubbery, strawberry plants, or the like, or wherever it is desirable to protect the individual plants from injury. By employing disinfectant in the liquid introduced into the pipes, it is possible to disinfect the trees or plants all at one time, or one at a time, and this system is particularly advantageous for this purpose. It will also be understood that not only are the individual trees capable of being protected from the effects of frost, but by these means the plants may also be irrigated. Under certain conditions, however, such for instance, where water is scarce, it is desirable that the irrigation be accomplished in the most economical manner, or with the least amount of loss possible, and I have, therefore, provided a special form of valve, shown particularly in Figs. 3 to 6, by which the water instead of passing upwardly through the vertical pipes D, may be turned out direct at the base of the tree or plant so that the water will be fed to the roots and not extend over a large area, as would be the case where the water is sprayed through the nozzle E. To accomplish this, the inlets to the respective vertical pipes D are provided with valves preferably, though not necessarily, formed as integral extensions of the said pipes D, as shown in Fig. 3. Each valve is provided with a horizontal partition 1', directly above which is an opening in the wall of the valve. The valve 1 in the embodiment shown in Fig. 3 is inserted in the valve coupling 3 until the flange 4 rests on the top of the coupling. Each valve 1 has its upper part formed integral or otherwise connected and suitably communicating with the respective vertical pipe D, and has its lower end open, the partition 1' being disposed between the respective apertures 2 and 8, and said apertures being arranged in different longitudinal planes of the valve but respectively in the planes of the apertures 6 and 7. The lower extremity of the valve extension 1 is preferably burred so as to hold the pipe and valve snugly in place but permit of their being easily rotated, as hereinafter set forth. The valve coupling 3 is formed with a lateral extension 5, into the opposite ends of which the branch pipes C are secured and said extension 5 is provided with the upper and lower passages 6 and 7 respectively. When the water is to be used for spraying the buds, or in other words, allowed to pass upwardly through the vertical pipe D, the latter is moved into a predetermined position so that the opening 2 registers with the passage 6 in the extension 5 of the valve coupling 3, the water passing therethrough, as indicated by the arrows in Fig. 3 of the drawing. However, when irrigating the individual trees, the pipe D is partially rotated until the opening 8 below the partition 1' registers with the passage 7, the water then passing downwardly through the lower end of the valve extension and being directly fed to the roots of the tree or plant. To cut off the flow of the water entirely, it is only necessary to rotate the pipe D so that the openings 2 and 8 will lie intermediate their operative positions.

In Fig. 5 I have illustrated a modified form of valve means for my system. As in the previous description, each branch pipe C is connected with the extension 5' of a valve coupling 5ª and said coupling is threaded at its upper portion to receive the lower end of the vertical pipe D. A valve 9 is adapted to be inserted in the valve coupling 5ª, said valve being provided with a flange 9' at its upper portion, by means of which it is seated in the coupling 5ª beneath the lower extremity of the pipe D. The valve is provided with an opening in which may be inserted a handle 10 extending through a slot in the wall of said coupling and by means of which the member 9 may be turned or rotated so as to bring the openings 2 and 8 in the wall of said member to register with the passages 6 and 7 in the extension 5" located above and below the partition 1' in the member 9, according to the desire of the operator. The operation of this valve is the same as described with respect to the preferred form shown in Fig. 3, and it will be obvious that slight changes in the construction may be readily made without departing from the spirit of the invention and within the scope of the claims hereto appended.

Having thus described the invention, what is claimed as new is:

1. In a system of the class described, the combination with a supply pipe having lateral outlets, of a discharge pipe disposed out of alinement with said supply pipe and extending substantially at right angles thereto, and a valve alined longitudinally and communicating at one end with said discharge pipe, the valve having a partition between the planes of the outlets and being provided with apertures disposed on opposite sides of the partition and out of alinement with each other, whereby they are adapted to be brought into register with the respective outlets at different times, the end of the valve opposite that end communicating with the discharge pipe being open.

2. A system of the class described, comprising a main fluid supply pipe, laterally extending branch pipes connected therewith, a plurality of vertical pipes adapted to be arranged adjacent to the trees or plants, each of said vertical pipes having at its lower portion a valve extension open at its lower end, said extension being formed with a partition therein and having openings in the wall thereof above and below said partition, a valve coupling connected with each of the branch pipes aforesaid and into which the extension is inserted, whereby the movement of the vertical pipe into a predetermined position will permit the fluid to flow through the upper portion of said pipe and when moved into another position to flow through the open lower end of said valve extension.

In testimony whereof I affix my signature in presence of two witnesses.

ROBERT DUNLAP.

Witnesses:
G. P. JESTER,
L. A. LANNER.